J. LOCKE,
Assignor to W. L. LIBBEY, dec'd., S. C. LIBBEY administratrix, and E. D. LIBBEY.
GLASS GLOBE.
No. 10,446. Reissued Feb. 5, 1884.
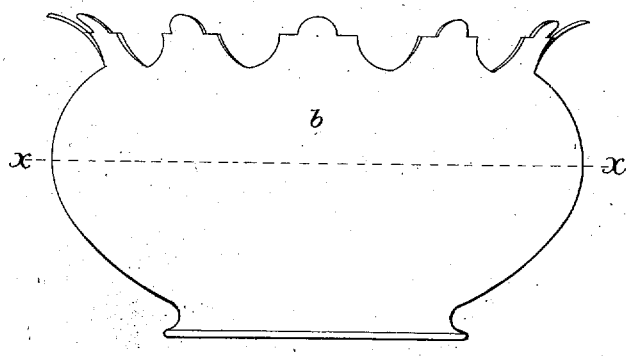
Witnesses,
Jos. P. Livermore
Henry Marsh.
Inventor,
Joseph Locke
by Crosby & Gregory
Attorneys.

UNITED STATES PATENT OFFICE.

JOSEPH LOCKE, OF SOMERVILLE, ASSIGNOR TO WILLIAM L. LIBBEY, OF NEWTON, (SARAH C. LIBBEY, ADMINISTRATRIX OF SAID WILLIAM L. LIBBEY, DECEASED,) AND EDWARD D. LIBBEY, OF BOSTON, MASS.

GLASS GLOBE.

SPECIFICATION forming part of Reissued Letters Patent No. 10,446, dated February 5, 1884.

Original No. 288,582, dated November 13, 1883. Application for reissue filed January 11, 1884.

*To all whom it may concern:*

Be it known that I, JOSEPH LOCKE, of Somerville, county of Middlesex, State of Massachusetts, have invented an Improvement in Glass Globes, of which the following description, in connection with the accompanying drawing, is a specification, like letters on the drawing representing like parts.

This invention has for its object the production of a transparent glass globe homogeneous in quality, but differing in color at different parts, the colors blending the one into the other, and all being transparent.

In the use of glass globes it is customary to provide the same with shades of a color darker than the natural color of the glass from which they are formed, in order to check or soften the light passing through, and it is also customary to grind plain glass globes to render portions of them translucent, and to make globes of colored glass; but in such case the globe is all of one color, or a globe of glass of one color is plated with glass of another color.

In order to soften or modify the light passing through a glass globe, and also gain pleasant effects in color on surrounding objects, I have produced a globe different portions of which present different colors, the darker color blending into the lighter, and serving as a shade integral with the globe, the light and darker portions of the globe being of the same piece of glass, uniform in texture or material, the color being entirely in the body, and not applied to the surface of the globe, as by paint or plating one class or color of glass upon another.

The drawing represents a glass globe for gas-burners embodying my invention.

As herein shown, the lower portion of the globe is of amber color, but the upper portion, *b*, is of ruby color, the two colors gradually blending into each other along the line *x x*, producing a globe the upper part of which is very much darker than the lower portion.

The globe herein described is made of so-called "amber glass" containing the metal gold, with or without other alloy, as described in my application, Serial No. 98,747, issued since the filing of this present application as Patent No. 282,002, July 24, 1883, and the darker color is developed by heat, as described in the said application, and being developed by heat, it will be obvious that either the upper or the lower end or other part of the globe may be made the darker in color.

I claim—

That improvement in the art or method of producing lamp-globes of two different colors from the same homogeneous stock which consists in forming the globe from amber glass, as described, and cooling and heating the same unequally to develop the darker colors where desired, substantially as described.

JOSEPH LOCKE.

Witnesses:
G. W. GREGORY,
B. J. NOYES.